United States Patent
Duffy

(10) Patent No.: US 6,820,899 B2
(45) Date of Patent: Nov. 23, 2004

(54) COLLAPSIBLE STEERING COLUMN ASSEMBLY FOR A VEHICLE

(75) Inventor: Patrick Anthony Duffy, Leicester (GB)

(73) Assignee: NSK Steering Systems Europe Limited, Nottinghamshire (GB)

(*) Notice: Subject to any disclaimer, the term of this patent is extended or adjusted under 35 U.S.C. 154(b) by 0 days.

(21) Appl. No.: 09/986,350

(22) Filed: Nov. 8, 2001

(65) Prior Publication Data
US 2002/0056981 A1 May 16, 2002

(30) Foreign Application Priority Data
Nov. 8, 2000 (GB) .............................................. 0027317

(51) Int. Cl.$^7$ ................................................ B62D 1/18
(52) U.S. Cl. ........................ 280/777; 280/779; 74/492
(58) Field of Search ................................ 280/777, 779; 74/492; 188/371, 376

(56) References Cited

U.S. PATENT DOCUMENTS

| | | | | |
|---|---|---|---|---|
| 4,943,028 A | * | 7/1990 | Hoffmann et al. | 248/548 |
| 4,989,898 A | * | 2/1991 | Yamaguchi et al. | 280/777 |
| 5,056,818 A | * | 10/1991 | Sadakata | 280/777 |
| 5,085,467 A | | 2/1992 | Converse | 280/777 |
| 5,375,881 A | * | 12/1994 | Lewis | 280/777 |
| 5,378,021 A | * | 1/1995 | Yamaguchi et al. | 280/777 |
| 5,520,416 A | * | 5/1996 | Singer et al. | 280/775 |
| 5,547,221 A | * | 8/1996 | Tomaru et al. | 280/777 |
| 5,618,058 A | * | 4/1997 | Byon | 280/777 |
| 5,704,641 A | * | 1/1998 | Shimizu et al. | 280/775 |
| 5,706,704 A | * | 1/1998 | Riefe et al. | 74/493 |
| 5,775,172 A | * | 7/1998 | Fevre et al. | 74/492 |
| 5,788,278 A | * | 8/1998 | Thomas et al. | 280/777 |
| 5,788,279 A | * | 8/1998 | Pfannebecker | 280/777 |
| 5,819,592 A | * | 10/1998 | Lewandowski et al. | 74/492 |
| 5,961,146 A | * | 10/1999 | Matsumoto et al. | 280/777 |
| 6,019,391 A | * | 2/2000 | Stuedemann et al. | 280/779 |
| 6,224,104 B1 | * | 5/2001 | Hibino | 280/777 |
| 6,378,903 B1 | * | 4/2002 | Yabutsuka et al. | 280/777 |
| 6,474,690 B1 | * | 11/2002 | Marxer et al. | 280/777 |

FOREIGN PATENT DOCUMENTS

| | | |
|---|---|---|
| DE | 35 21 644 | 12/1986 |
| EP | 0 448 246 | 9/1991 |
| EP | 0 949 136 | 10/1999 |
| GB | 1125206 | 8/1968 |
| GB | 1 283 598 | 7/1972 |
| GB | 1 322 232 | 7/1973 |
| GB | 2 288 154 | 10/1995 |

* cited by examiner

Primary Examiner—Paul N. Dickson
Assistant Examiner—George D. Spisich
(74) Attorney, Agent, or Firm—Mitchell W. Shapiro; Miles & Stockbridge P.C.

(57) ABSTRACT

A collapsible steering column assembly includes a steering column mounting bracket with a deformable component that is joined to the mounting bracket and that can collapse in the event of vehicle crash thereby to absorb energy. The deformable component is restrained in a normal position by locating means and is provided with regions of weakness to allow collapse. The provision of such deformable means actually in the mounting bracket itself eliminates the need for additional brackets, for example, to achieve the same purpose.

11 Claims, 2 Drawing Sheets

COLLAPSIBLE STEERING COLUMN ASSEMBLY FOR A VEHICLE

BACKGROUND OF THE INVENTION

This invention relates to a collapsible steering column assembly for a vehicle.

DESCRIPTION OF THE PRIOR ART

A vehicle steering column assembly is required to collapse in a controlled manner in the event of a vehicle crash. During a crash event, the steering column assembly should be able to accommodate collapse from the front of the vehicle, for example in order to accommodate intrusion of an engine compartment firewall and, in addition, the assembly should also be able to collapse away from the driver of the vehicle.

SUMMARY OF THE INVENTION

According to the present invention, there is provided a collapsible steering column assembly for a vehicle, the assembly including a steering column mounting bracket itself being mountable on a vehicle body part, there being a deformable component that is joined to the mounting bracket and that can collapse in the event of vehicle crash thereby to absorb energy.

The deformable component can be integral with the mounting bracket.

The mounting bracket can support upper and lower subassemblies of a steering column. The upper and lower subassemblies can be slidably mounted one on the other.

The deformable component may be restrained in its normal positional relationship with the mounting bracket by at least one locating means. The locating means can comprise at least one slot in one of the mounting bracket or the deformable component and a locating pin on the other of the mounting bracket or deformable component. There may be two such slots and mating pins. The or each slot may be an open slot.

The deformable component can comprise at least one stiff strip so configured as to provide a region of weakness about which the strip can be bent and thus collapsed upon receiving a compressive force along the length of the strip. One end of the strip may be joined to the mounting bracket and the other, free end of the strip may form a mounting for a pivot member. The pivot member may support a universal joint bearing assembly of the steering column.

The steering column assembly may provide for rake and/or reach adjustment of the steering column.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
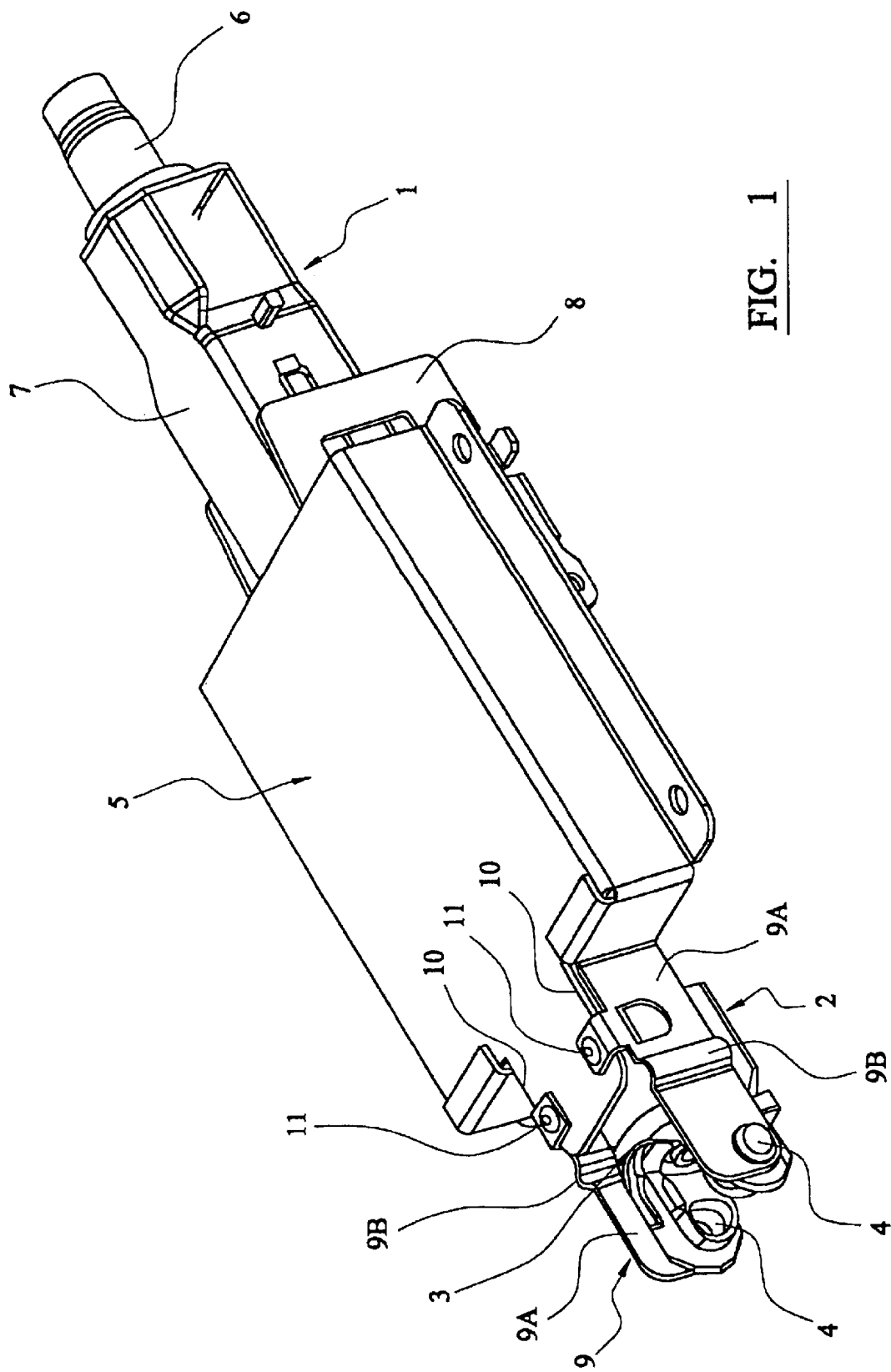
FIG. 1 is a diagrammatic perspective view of part of a collapsible steering column assembly shown in a condition before a vehicle crash.

The steering column assembly includes upper and lower column subassemblies 1, 2, which are slidable one within the other, relative rotation between the two subassemblies being prevented, for example, by a spline interface (not shown). A steering wheel (not shown) will be attached to the upper end of the upper subassembly 1, whilst the lower end of the lower subassembly 2 is coupled to a pivot member 3 in the form of a bracket, the pivot member 3 carrying a yoke of a universal joint.

The pivot member 3 is pivotally linked by pins 4 to part of a steering column mounting bracket 5 that is fixedly mountable on a vehicle body part such as a crossbeam (not shown).

The upper subassembly 1 includes an upper steering column tube 6 mounted on a support bracket 7 that is itself slidably mounted on a second, support bracket 8 so as to allow, in normal operating conditions of the steering column assembly, reach and/or rake adjustment of the steering column. Means (not shown) are provided therefore to clamp the support bracket 8 to the support bracket 7 once the reach and/or rake adjustment of the steering column has been made.

As mentioned, in the event of vehicle crash, the steering column assembly should be able to accommodate collapse from the front, i.e. by intrusion of a firewall (not shown) and this is arranged to act on a deformable component 9 in the form of two metal strips 9A extending from the mounting bracket 5 itself.

In the embodiment shown, it will be seen that the two strips 9A are actually part of the mounting bracket 5 but each is split from it in the regions indicated by the reference numerals 10 but is fixed on itself in those regions 10 by devices 11. These devices 11 are in fact pins which are fitted in respective open, angled slots 12 (FIG. 2) in an upper plate of the mounting bracket 5.

Each strip 9A is provided with bent or crimped regions 9B which provide regions of weakness to allow the strips 9A forming the deformable component to collapse in the event of end-on forces on the strips.

Accordingly, the steering column assembly is connected to the mounting bracket 5 through the pivot bracket 3 and the deformable component 9. The regions 9B of the deformable component of the mounting bracket therefore have predefined configurations which, in normal use, have no effect on the function of the steering column.

Figure 2:
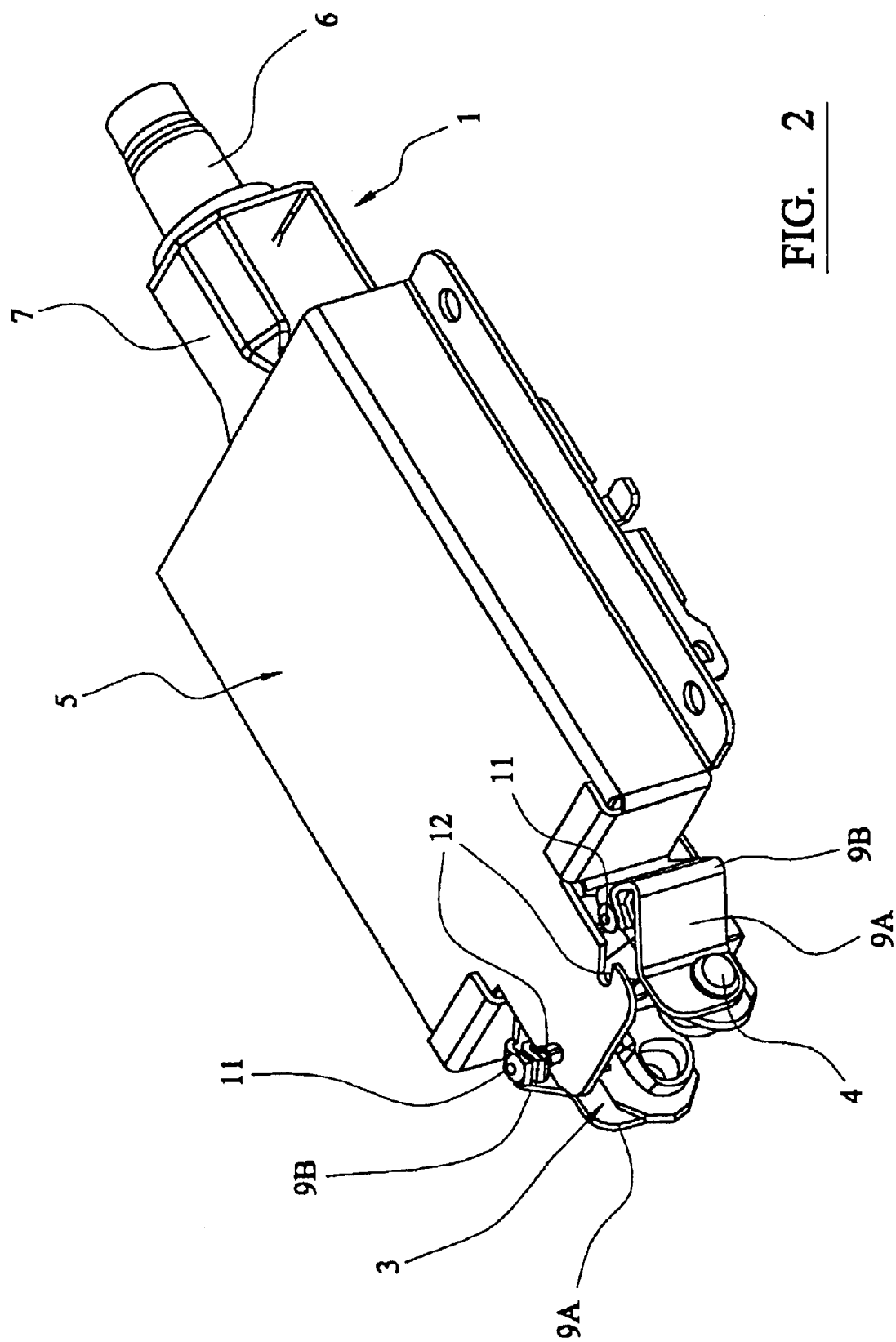
FIG. 2 is a view similar to FIG. 1 but showing the assembly in a condition that it can adapt after a vehicle crash.

However, in the event of vehicle crash, the forces generated will be sufficient to act on the deformable component 9 and thereby allow for intrusion of the firewall. As can be seen in FIG. 2, the forces generated will dislocate the locating pins 11 from their retaining slots 12, which are angled towards the direction of applied force so that the pins are released and the deformable regions 9B of the strips 9A initiate the deformable component 9 to collapse on itself. This thereby allows the firewall to displace the lower (front) end of the mounting bracket 5 and also any brackets connected in this area, such as the pivot bracket 3.

The locating points comprising the pins 11 and slots 12 can be formed as clamping devices to provide further controlled load in the region of the deformable component.

It will be appreciated that the present arrangement allows for a predefined collapse direction to be achieved whilst enabling a predictable system to be constructed as regards loads generated. Also, intrusion displacement of the firewall can be achieved thereby without the requirement of additional brackets, for example.

I claim:

1. A collapsible steering column assembly for a vehicle, the assembly including, a steering column mounting bracket having, at a forward end thereof, a deformable component that supports a lower subassembly of said steering column and can collapse in the event of a vehicle crash thereby to absorb energy, wherein the deformable component has a normal positional relationship with the mounting bracket in which it is restrained by two locating devices, each having at least one open slot in the mounting bracket and a locating pin on the deformable component that mates with the respective open slot.

2. An assembly according to claim 1, wherein the deformable component is unitary with the mounting bracket.

3. An assembly according to claim 1, wherein the mounting bracket supports an upper subassembly and said lower subassembly of the steering column.

4. An assembly according to claim 3, wherein the upper and lower subassemblies are slidably mounted one on the other.

5. An assembly according to claim 1, wherein the deformable component comprises at least one stiff strip so configured as to provide a region of weakness about which the strip can be bent and thus collapsed upon receiving a compressive force along the length of the strip.

6. An assembly according to claim 1, further including a provision for rake and/or reach adjustment of the steering column.

7. The collapsible steering column assembly of claim 1, wherein said at least one open slot is a laterally open slot.

8. A collapsible steering column assembly for a vehicle, the assembly including, a steering column mounting bracket having at a forward end thereof a deformable component that supports a lower subassembly of said steering column and that can collapse in the event of a vehicle crash thereby to absorb energy, wherein the deformable component comprises at least one stiff strip so configured as to provide a region of weakness about which the strip can be bent and thus collapsed upon receiving a compressive force along the length of the strip, and wherein said strip has one end that is joined to the mounting bracket and another end that is free, said free end of the strip forming a mounting for a pivot member.

9. An assembly according to claim 8, wherein the pivot member supports a universal joint bearing assembly of the steering column.

10. A collapsible steering column assembly for a vehicle, comprising:

upper and lower subassemblies that are slidable one within the other;

the upper subassembly being slidably mounted on a fixed mounting bracket mountable on a vehicle body part;

the mounting bracket including, at its end remote from the upper subassembly, a deformable bracket supporting said lower subassembly and capable of deformation toward the upper subassembly so as to allow movement of said lower subassembly toward said upper subassembly in the event of a vehicle crash.

11. A collapsible steering column assembly for a vehicle, comprising:

upper and lower subassemblies that are slidable one within the other;

the upper subassembly being slidably mounted on a fixed mounting bracket mountable on a vehicle body part;

the mounting bracket including, at its end remote from the upper subassembly, a deformable bracket supporting said lower subassembly and capable of deformation toward the upper subassembly to absorb impact of a primary collision.

* * * * *